United States Patent [19]
Saito

[11] 4,378,267
[45] Mar. 29, 1983

[54] APPARATUS FOR MANUFACTURING COAXIAL CABLE

[75] Inventor: Yasunori Saito, Kanagawa, Japan

[73] Assignee: Sumitomo Electric Industries, Ltd., Osaka, Japan

[21] Appl. No.: 883,427

[22] Filed: Mar. 3, 1978

[30] Foreign Application Priority Data

Mar. 4, 1977 [JP] Japan .................. 52-22859

[51] Int. Cl.³ .................................. B32B 31/20
[52] U.S. Cl. .................... 156/498; 156/500; 425/71; 425/113; 425/326.1; 425/388; 425/392
[58] Field of Search ............ 156/51, 500, 498; 425/71, 112, 113, 122, 327, 326.1, 392, 388, 405

[56] References Cited

U.S. PATENT DOCUMENTS

| | | | |
|---|---|---|---|
| 3,296,661 | 1/1967 | De Moustier | 425/379 |
| 3,538,210 | 11/1970 | Gatto | 425/71 |
| 3,804,567 | 4/1974 | Recknagel | 425/71 |
| 4,022,557 | 5/1977 | Johnson | 425/71 |
| 4,029,452 | 6/1977 | Schippers et al. | 425/71 |

*Primary Examiner*—Caleb Weston
*Attorney, Agent, or Firm*—Sughrue, Mion, Zinn, Macpeak & Seas

[57] ABSTRACT

In the dual extrusion manufacture of an insulated coaxial cable having one or more spiral spacing ribs 2a wrapped around an inner conductor 1 and surrounded by a tubular sheath 2b, the longitudinal contraction of the sheath during cooling and the attendant warp curvature of the rib is avoided by providing a sizing device 7 having a central die portion 12 with vacuum exhaust holes 14 therein. Water from a cooling pool 8 is drawn in through the clearance space between the sheath and the die portion as the cable passes therethrough to precool and lubricate it, and one or more dies 15 are provided in the cooling pool to prevent the longitudinal contraction of the sheath and thereby avoid any appreciable rib inclination or curvature.

4 Claims, 5 Drawing Figures

APPARATUS FOR MANUFACTURING COAXIAL CABLE

BACKGROUND OF THE INVENTION

This invention relates to a method and apparatus for manufacturing coaxial cable of the type wherein a plastic insulating material is extruded and wrapped around the outer periphery of an inner conductor of copper, aluminum, etc. to form one or more spiral spacing ribs, and a tubular insulating sheath is simultaneously formed on the outer periphery of the rib.

In conventional coaxial cables various types of insulating layers have been proposed to obtain low dielectric constant or permittivity and enhance mechanical strength. In one type of such cable a polyethylene cord or ribbon having a rectangular cross-section is spirally wound around the inner conductor to form a helical spacing rib and an insulating sheath is thereafter formed around the rib by extruding a polyethylene tube thereover, or alternatively the spirally formed rib and surrounding tubular sheath may be simultaneously formed on the inner conductor by concurrent plastic extrusions.

The present invention relates to an improvement of the latter conventional method. According to such method the insulating layer is obtained by extruding a molten plastic material onto the travelling inner conductor to form a spiral rib, and the concurrently extruded outer sheath is melt bonded to the ridge portion of the rib. As illustrated in FIG. 1, an inner conductor 1 supplied from a supply bobbin 3 is passed through reforming rollers 4 to remove any curl or set due to the bobbin winding, and the linear conductor is thereafter fed through a preheater 5 to a dual extruder 6 at which an insulating layer 2 consisting of a spirally wound rib 2a and a surrounding tubular sheath 2b is formed on the conductor, as illustrated in FIG. 2. The insulated cable core is then passed through a vacuum sizing device 7 to obtain a uniform diameter through its length and through a water pool 8 to coolingly solidify it.

The rib 2a initially extends outwardly in a radial direction immediately after passing through the sizing device 7, as seen in FIG. 3(a). According to this conventional method, however, as the extrusion speed or conductor feed speed increases the rib gradually becomes curved during the solidification process as seen in FIG. 3(b), and upon final completion of the solidification the rib is further curved as seen in FIG. 3(c). This phenomenon is explained as follows. In the simultaneous extrusion of the molten plastic material to form the rib and the sheath, the root portion of the rib is melt bonded to the inner conductor and the ridge portion thereof to the inner periphery of the sheath. Since the sheath is radially outwardly expanded when it passes through the vacuum sizing device to control its outer diameter, no rib curvature occurs. During the subsequent cooling process, however, the tubular sheath thermally contracts in a longitudinal direction to a greater degree than the inner conductor, and the tensile stress exerted on the rib root thereby causes the curvature seen in FIGS. 3(b) and 3(c). Such a warped rib insulating layer as shown in FIG. 3(c) does not possess high mechanical strength and uniformity throughout its length, and a coaxial cable employing such an insulating layer has poor high frequency transmission and mechanical strength characteristics.

SUMMARY OF THE INVENTION

Briefly, and in accordance with the present invention, the rib warping or distortion drawback described above is overcome by providing a vacuum sizing device including cylindrical die members and vacuum exhaust holes therein, disposed between a dual extruder and a water pool for cooling the extruded insulating layer. The vacuum sizing device consists of inlet, outlet and intermediate die portions, at the ends of which vacuum exhaust holes are provided to draw in and discharge water from the cooling pool connected to the outlet die portion through the clearance space defined between the inner periphery of the die and the outer periphery of the tubular sheath. At least one radially limiting die is also provided in the water pool to prevent the longitudinal contraction of the insulating layer as it passes therethrough during the cooling process.

DETAILED DESCRIPTION OF THE PREFERRED EMBODIMENTS

Figure 4:
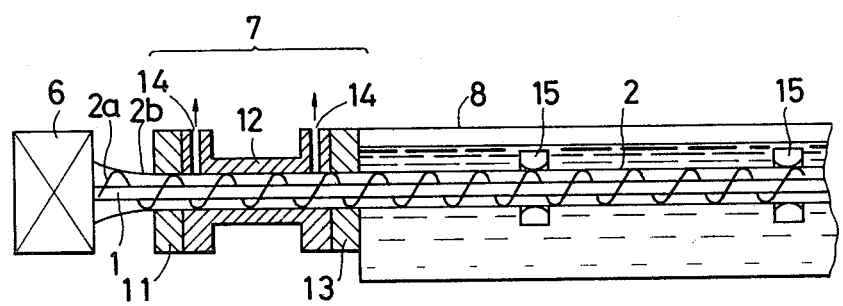
FIG. 4 shows a schematic view of an apparatus according to a first embodiment of the present invention.

Referring now to the drawings and initially to FIG. 4, an insulating layer 2 consisting of a spiral rib 2a wrappingly extruded on the outer periphery of an inner conductor 1 and a tubular sheath 2b simultaneously extruded on the outer periphery of the rib by a dual extruder 6 is passed through a vacuum sizing device 7 to uniformly control the sheath diameter throughout its length and to melt bond the rib and the sheath. The vacuum sizing device consists of an inlet die portion 11, an intermediate die portion 12 and an outlet die portion 13. At the ends of the intermediate die portion 12 vacuum exhaust holes 14 are provided to draw in and discharge water from a cooling pool 8 connected to the outlet die portion 13 through the clearance space defined between the die and the sheath. This initial water contact implements a certain degree of pre-cooling and reduces the thermal shock as the insulating layer enters the cooling pool, which reduces the longitudinal contraction of the sheath and the attendant radial distortion of the rib, and also serves to lubricate the sheath as it passes through the sizing device dies. After it has passed through the vacuum sizing device the insulating layer 2 enters the cooling pool 8 in which at least one die 15 is disposed to forcibly prevent the sheath from thermally contracting in a longitudinal direction.

With such an arrangement, even if high speed extrusion is performed the outer diameter of the sheath is maintained substantially uniform throughout its length while at the same time the disadvantageous inclination of the rib upon completion of the cooling and solidification is avoided.

Figure 5:
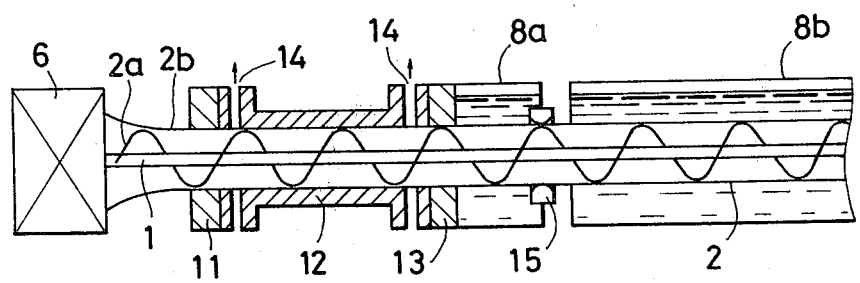
FIG. 5 shows a schematic view of an apparatus according to a second embodiment of the present invention.

FIG. 5 shows an alternative embodiment of the invention wherein the cooling pool is divided into two pools 8a and 8b and at least one die 15 is provided in the pool 8a connected to the vacuum sizing device 7. This arrangement provides the same effects realized in the first embodiment.

EXAMPLE

Figure 1:
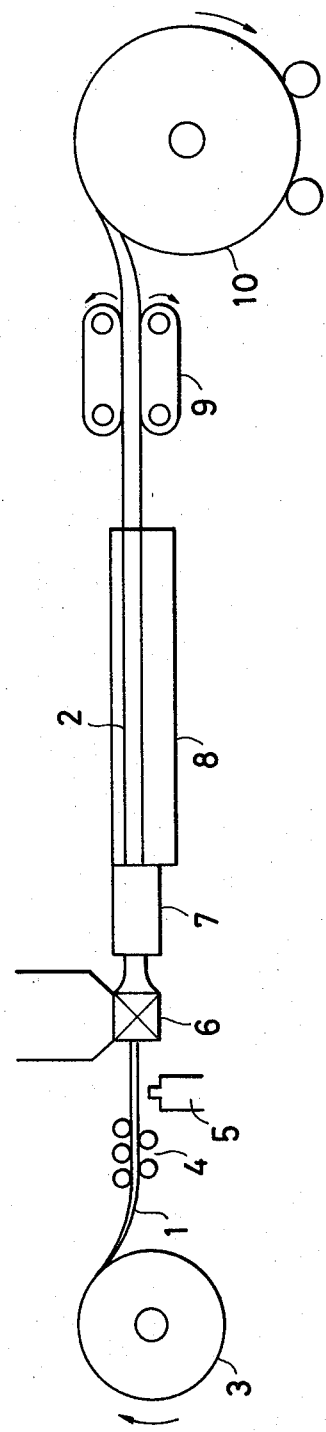
FIG. 1 shows a schematic view of a conventional apparatus for producing a spirally insulated coaxial cable core by the simultaneous extrusion method.
Figure 3C:
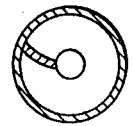
FIGS. 3(a)–3(c) show transverse cross-sectional elevations of the spiral insulating layer during various stages of cooling.
Figure 3B:
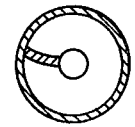
Figure 3A:
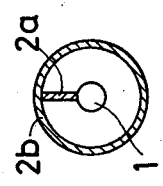
Figure 2:
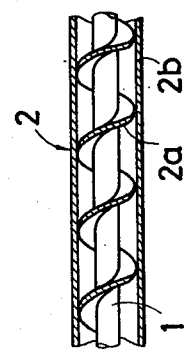
FIG. 2 shows a longitudinal cross-sectional elevation of the spiral insulating layer.

An insulated core for use in a coaxial cable having a characteristic impedance of 50Ω was produced using the conventional apparatus shown in FIG. 1 and an apparatus according to the second embodiment of the invention shown in FIG. 5. The latter employed two dies 15 spaced 5 m apart in the first pool 8a connected to the sizing device 7, and each die diameter was slightly smaller than the entering diameter of the sheath. In both apparatuses, the longitudinal length of the vacuum sizing device was 50 cm. The inner conductor was made of aluminum pipe having an outer diameter of 15 mm, and was coated with low density polyethylene by simultaneous extrusion to form a spiral spacing rib and a surrounding tubular sheath.

The rib in the core made by the conventional apparatus became inclined or curved when the conductor feed speed exceeded 3 m/min., whereas using the apparatus of the present invention it was possible to produce an insulating layer at conductor feed speeds above 5 m/min without any appreciable rib inclination or curvature.

What is claimed is:

1. In an apparatus for manufacturing a coaxial cable core and including, in succession, a dual extruder for simultaneously forming one or more spiral ribs on the outer peripheral surface of an inner conductor and a tubular sheath of plastic insulating material surrounding the outer periphery of the ribs, sizing means for controlling the outer diameter of the sheath, and a water pool for cooling the extruded insulating material, said sizing means communicating with the pool for drawing water therefrom through the sizing means to pre-cool and lubricate the insulating materials, the improvement characterized by:

at least one die other than said sizing means disposed in the water pool, said at least one die having a diameter slightly smaller than the entering diameter of the sheath in order to prevent the longitudinal contraction of the sheath as it passes therethrough.

2. An apparatus as defined in claim 1, wherein said improvement is further characterized in that said sizing means is a vacuum sizing device comprising one or more cylindrical dies each having vacuum exhaust means therein in communication with the pool for drawing water from the pool through the vacuum sizing device.

3. An apparatus as defined in claim 2, wherein said vacuum sizing device comprises an inlet die portion (11) positioned near the extruder, and intermediate die portion (12), and an outlet die portion (13) positioned near the water pool, the intermediate die portion being provided with a plurality of vacuum exhaust holes (14) at the ends thereof for drawing in water from the pool through the clearance space defined between the inner periphery of the intermediate die portion and the outer periphery of the sheath, and for discharging the water.

4. An apparatus as defined in claims 1, or 3, wherein the water pool is divided into two pools, one of said pools being connected to the sizing means and having at least one die disposed therein to prevent the longitudinal contraction of the sheath as it passes therethrough.

* * * * *